US009542251B2

(12) United States Patent
Cooke

(10) Patent No.: US 9,542,251 B2
(45) Date of Patent: Jan. 10, 2017

(54) ERROR DETECTION ON A LOW PIN COUNT BUS

(71) Applicant: Oracle International Corporation, Redwood Shores, CA (US)

(72) Inventor: Scott D. Cooke, Townsend, MA (US)

(73) Assignee: Oracle International Corporation, Redwood Shores, CA (US)

( * ) Notice: Subject to any disclaimer, the term of this patent is extended or adjusted under 35 U.S.C. 154(b) by 515 days.

(21) Appl. No.: 14/067,515

(22) Filed: Oct. 30, 2013

(65) Prior Publication Data

US 2015/0121149 A1    Apr. 30, 2015

(51) Int. Cl.
*G06F 13/36* (2006.01)
*G06F 11/07* (2006.01)
*H04L 1/00* (2006.01)

(52) U.S. Cl.
CPC ....... *G06F 11/0745* (2013.01); *G06F 11/0784* (2013.01); *H04L 1/0041* (2013.01); *H04L 1/0045* (2013.01); *H04L 1/0061* (2013.01); *H04L 2001/0094* (2013.01)

(58) Field of Classification Search
CPC .................. G06F 11/0751; G06F 11/0772
USPC .................... 370/402; 713/305–315
See application file for complete search history.

(56) References Cited

U.S. PATENT DOCUMENTS

| 4,268,902 | A | * | 5/1981 | Berglund | G06F 11/2733 |
| | | | | | 710/305 |
| 4,445,177 | A | * | 4/1984 | Bratt | G06F 8/41 |
| | | | | | 712/245 |
| 4,531,213 | A | * | 7/1985 | Scheuneman | G06F 11/1032 |
| | | | | | 714/703 |
| 4,823,347 | A | * | 4/1989 | Chin | G06F 11/10 |
| | | | | | 714/800 |
| 4,875,209 | A | * | 10/1989 | Mathewes, Jr. | G01R 31/318566 |
| | | | | | 714/703 |
| 4,999,837 | A | * | 3/1991 | Reynolds | G06F 11/2215 |
| | | | | | 714/10 |
| 5,003,463 | A | * | 3/1991 | Coyle | G06F 13/4059 |
| | | | | | 710/57 |
| 5,003,508 | A | * | 3/1991 | Hall | G06F 15/17381 |
| | | | | | 710/106 |
| 5,033,050 | A | * | 7/1991 | Murai | G06F 11/10 |
| | | | | | 714/800 |
| 5,095,485 | A | * | 3/1992 | Sato | G06F 11/10 |
| | | | | | 712/42 |
| 5,155,735 | A | * | 10/1992 | Nash | G06F 11/10 |
| | | | | | 710/260 |

(Continued)

OTHER PUBLICATIONS

Intel® Low Pin Count (LPC)—Interface Specification, Revision 1.1, Document No. 251289-001, Aug. 2002, 54 pages.

*Primary Examiner* — Paul R Myers
(74) *Attorney, Agent, or Firm* — Meyertons, Hood, Kivlin, Kowert & Goetzel, P.C.

(57) ABSTRACT

Systems and methods that implement communication of error information on a bus, including a bus having a small number of pins are disclosed. In one embodiment, an apparatus includes an interface circuit configured to couple to a bus and one or more sideband signals. The sideband signals may be used to communicate error information such as parity information for a bus that does not otherwise have this capability. In some embodiments, parity information may be driven on the bus during a portion of a bus transaction corresponding to unused address bits.

19 Claims, 10 Drawing Sheets

(56) References Cited

U.S. PATENT DOCUMENTS

| | | | | |
|---|---|---|---|---|
| 5,235,602 A * | 8/1993 | Klim | ................ | G06F 11/10 714/23 |
| 5,450,551 A * | 9/1995 | Amini | ................ | G06F 13/30 710/119 |
| 5,453,999 A * | 9/1995 | Michaelson | ................ | G06F 11/10 714/805 |
| 5,724,528 A * | 3/1998 | Kulik | ................ | G06F 13/4027 710/311 |
| 5,764,935 A * | 6/1998 | Bechtolsheim | ................ | G06F 13/364 710/110 |
| 5,790,870 A * | 8/1998 | Hausauer | ................ | G06F 11/0793 710/260 |
| 7,031,333 B1 * | 4/2006 | Findlater | ................ | H04L 12/66 370/419 |
| 2002/0184550 A1 * | 12/2002 | Chadha | ................ | H04L 7/0008 713/401 |
| 2003/0046628 A1 * | 3/2003 | Rankin | ................ | G06F 11/0724 714/752 |
| 2003/0093607 A1 * | 5/2003 | Main | ................ | G06F 13/4045 710/306 |
| 2004/0015691 A1 * | 1/2004 | Collette | ................ | H04L 12/56 713/161 |
| 2007/0226549 A1 * | 9/2007 | Anastasiadis | ................ | H04L 49/555 714/699 |
| 2007/0288737 A1 * | 12/2007 | Boyle | ................ | G06F 8/65 713/1 |
| 2012/0239900 A1 * | 9/2012 | Nautiyal | ................ | G06F 13/1668 711/170 |
| 2014/0156905 A1 * | 6/2014 | Butcher | ................ | G06F 13/36 710/315 |
| 2014/0250353 A1 * | 9/2014 | Choi | ................ | G06F 11/1048 714/800 |

* cited by examiner (option 1)

(option 2)

ERROR DETECTION ON A LOW PIN COUNT BUS

BACKGROUND

Technical Field

This disclosure relates generally to the communication of error information on a bus.

Description of the Related Art

Communication of information over buses is ubiquitous within computer systems. Accordingly, there are a very large number of computer bus standards. These buses can have a wide variety of footprints. Some buses, for example, may have a large number of signal lines, which may provide throughput for a correspondingly large amount of data (e.g., for a front-side processor bus). A PCI bus is one example of such a bus. On the other hand, certain buses may have a much smaller footprint—for example, an $I^2C$ bus, embodiments of which may have two lines, can be used to interface to low-speed peripherals.

Various types of circuits may be coupled to computer buses, including processing elements, memory controllers, peripherals, etc. Such devices pass information including address, data, and control to one another over these buses. From time to time, information being transmitted on a computer system bus may be corrupted. Such unintended changes may occur in a variety of manners—for example, during writing, reading, storage, transmission or processing of data. Data that is "silently" corrupted—that is, without being detected by the computer system—may cause catastrophic failures.

SUMMARY

In one embodiment, an apparatus is disclosed that includes a bus interface circuit configured to couple to a serial bus and a first sideband signal line for the serial bus. The bus interface circuit is further configured to drive an error value on the first sideband signal line in response to detecting an error condition on the serial bus. In some embodiments, the serial bus in the apparatus is a low pin count bus. The low pin count bus may have between five (5) to ten (10) signal lines. The apparatus disclosed may have a bus interface circuit configured to multiplex address and data information on a plurality of address/data signals of the serial bus. In some embodiments, the apparatus further comprises a first processing element and a second processing element coupled via the serial bus; the error condition indicates a parity error for data transmitted by the first processing element over the serial bus to the second processing element. In other embodiments, the bus interface circuit is further configured to couple to a second sideband signal line for the serial bus; the bus interface circuit is further configured, in response to detecting the error condition, to drive an error type value on the second sideband signal line to indicate a type of the error condition.

In some embodiments, the apparatus includes a module with a first processing element and a second processing element coupled via the serial bus. The error condition indicates a parity error for data transmitted by the first processing element over the serial bus to the second processing element. In various embodiments the apparatus includes a bus interface circuit further configured to couple to a second sideband line for the serial bus, where the bus interface circuit is further configured to drive parity information on the second sideband signal line for information transmitted over the serial bus.

In another embodiment, a method is disclosed that includes a first device transmitting a read request over a low pin count bus to a second device, where the transmitting includes the first device transmitting information to the second device during an addressing portion of the read request. The information includes an address for the read request and parity information for the read request, and the parity information is transmitted during a part of the addressing portion of the read request corresponding to available address bits that are unused by the address. The method further includes the first device receiving, over the low pin count bus, data from the second device that is responsive to the read request.

In some embodiments, the method further comprises the first device receiving, over a sideband signal to the low pin count bus, parity information for the data that is responsive to the read request. The method may also comprise, in some embodiments, the first device receiving, over a first sideband signal to the low pin count bus, an error indication from the second device, where the error indication corresponds to the read request. Such a method may further comprise the first device receiving, over a second sideband signal to the low pin count bus, an error type value indicating a type of error indicated by the first sideband signal.

DETAILED DESCRIPTION

Figure 1:
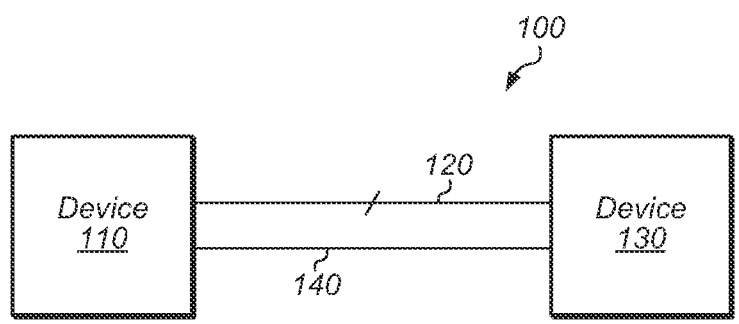
FIG. 1 is a block diagram for a system using one embodiment of a low pin count bus with error checking.

Turning now to FIG. 1, a block diagram of one embodiment of a communication system 100 is shown. As illustrated, system 100 includes devices 110 and 130 coupled by a bus 120. Devices 110 and 130 broadly represent any circuits, units, or other structures that need to communicate information to one another over a bus 120. For example, in one embodiment device 110 may correspond to a microprocessor and device 130 may correspond to a bridge device that links device 110 to another bus, network, etc. In another embodiment, device 110 may correspond to a service processor and device 130 corresponds to an FPGA. In this exemplary embodiment, the FPGA may function as a miscellaneous function collector and serve as the primary communication bridge between the service processor and a host. In various other embodiments, one or both of devices 110 and 130 may correspond to a low-bandwidth device configured to connect to a CPU or host. In some embodiments, one or both of devices 110 and 130 may be a boot ROM or a variety of legacy I/O devices including serial and parallel ports, PS/2 keyboard, PS/2 mouse, and floppy disk controllers. In general, devices 110 and 130 can correspond to any type of structure that is configured to interface to a bus.

The term "bus" refers to a set of physical connections that are shared among two or more structures (e.g., devices 110 and 130) to communicate information. In one embodiment, for example, bus 120 might include 16 physical connections shared between devices 110 and 130 to communicate data, address, and other information. In some embodiments, bus 120 includes a plurality of physical signal lines or wires, such as those located on a printed circuit board or other medium.

In the embodiment shown in FIG. 1, bus 120 is based on a protocol that does not include the capability to communicate certain types of error information between devices 110 and 130. Accordingly, bus 120 is used in FIG. 1 to refer to any type of bus that lacks such a capability. Note that, in certain embodiments, bus 120 may have some error checking capability but not others.

For example, a protocol associated with bus 120 may be based on a standard/protocol that does not include the ability to communicate error correction bits (e.g., a parity bit) between devices 110 and 130. In such a configuration, the performance of system 100 may be compromised. That is, absent error checking, system 100 may exhibit silent data corruption. For example, when device 110 passes data having a flipped bit to device 130, which might, without any error checking protocol, store the corrupted data in memory for subsequent use.

Accordingly, in one embodiment, bus 120 may be based on a standard that lacks certain error correction capabilities. The absence of such functionality may be acceptable in some situations to achieve increased design simplicity or reduced cost. In other situations in which it may be desirable to use bus 120, however, it may not be tolerable (or practical) to forego certain error correction capabilities (e.g., parity checking or more sophisticated forms of error correction).

For example, bus 120 may be based on a standard with a reduced number of signals relative to other buses. One type of bus common in legacy computer architectures is the Industry Standard Architecture (ISA) bus. Some implementations of this bus may include 31-49 signals. In contrast, INTEL's Low Pin Count (LPC) bus was introduced in 1998 as a reduced pin-count version of the ISA bus. The LPC bus is designed to be compatible with ISA-based software, but is implemented with as few as 7 signals. Accordingly, circuitry designed to couple to an LPC bus may have a reduced number of input/output pins relative to a more traditional ISA-compatible circuit. As promulgated, the LPC bus standard (and, more generally, other reduced pin count buses) does not include error correction and reporting capabilities. For example, LPC bus implementations do not include the ability to communicate parity information or report parity errors.

As will be described in greater detail below, communication system 100 may be improved by the addition of one or more supplementary signals that permit devices coupled to bus 120 to communicate error information associated with transactions over bus 120. (As used herein, the term "transaction" refers to a particular type of access or other communication over a bus. For example, a protocol associated with bus 120 may define a read transaction, a write transaction, or any other type of suitable communication between two devices coupled to the bus.) These supplementary signals are indicated in FIG. 1 by reference numeral 140. In some embodiments, these signals may be referred to as "sideband" signals in that they are not specified by the protocol for bus 120; rather, these signals have been added as an extension to that protocol.

As will be described below, in some embodiments, sideband signals 140 may be used to provide error information and reporting signals in conjunction with a standard reduced pin count bus. In certain embodiments, this combination may provide several advantages. The use of a standard bus implementation may save resources from a design standpoint, for example by allowing standard bus interface circuitry to be reused in whole or part. Further, in situations in which a reduced pin count bus may be advisable (e.g., due to real estate concerns on a printed circuit board), the use of supplementary error signals as described herein may obviate the need to use a different bus protocol with intrinsic error reporting capability. (In some cases, such buses may have 5-10× the number of signal lines as a reduced pin count bus.) The use of an otherwise standard bus protocol with supplementary signals for transmitting error information may advantageously permit increased system performance by reducing issues relating to data corruption.

Figure 2A:
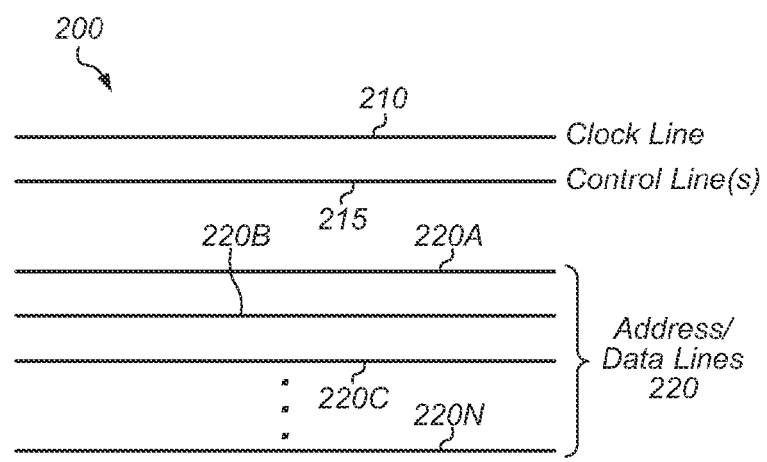
FIG. 2A is a diagram illustrating one embodiment of a low pin count bus.
Figure 2B:
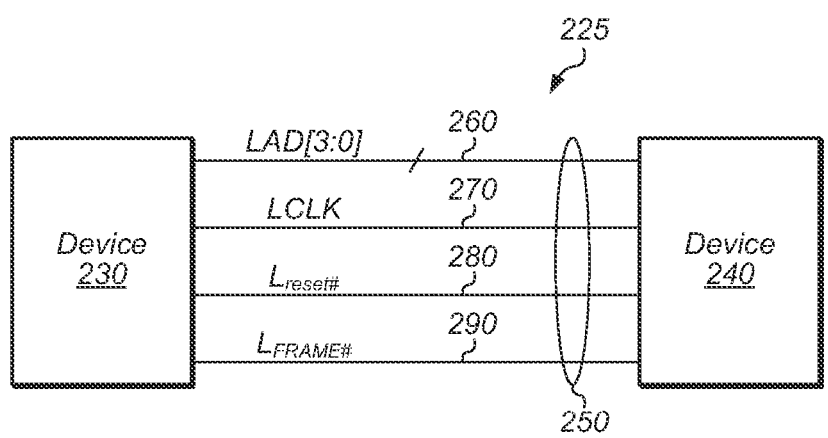
FIG. 2B is a diagram illustrating INTEL's low pin count bus.

Turning now to FIG. 2A, a diagram of an exemplary bus 200 is shown. Bus 200 may be used as bus 120 in certain embodiments of system 100. In some embodiments, bus 200 may be a reduced pin count bus. As used herein, the phrase "reduced pin count bus" refers to a bus that implements the functionality of some bus protocol using fewer signals/pins than are otherwise used. For example, in one embodiment, bus 200 may implement the functionality of an Industry Standard Architecture (ISA) bus to software programmed to use an ISA bus. In various embodiments, however, a reduced pin count bus may be quite different physically from an ISA bus in that it uses fewer pins than a traditional ISA bus. Bus 200 may also be referred to in some embodiments as a "low pin count bus." As used herein, this term refers to a bus having a specification that includes at least two (2) and no more than fifteen (15) mandatory signals. Certain embodiments of a low pin count bus include at least five (5) and no more than ten (10) mandatory signals. FIG. 2B discussed below depicts one example of such a low pin count bus. (The term "mandatory signals" refers to signals in the bus specification or protocol that are not optional to implement.) In some cases, a bus may be both a reduced pin count bus and a low pin count bus. The terms are not always synonymous, however. For example, a hypothetical bus may be a low pin count bus because it has seven (7) mandatory signals, but may not be a reduced pin count bus (as that term is used in this disclosure) if it is not a reduced-signal version of some other bus.

Low pin count bus 200 in FIG. 2A is comprised of a clock line 210, one or more control lines 215, and a plurality of parallel bidirectional bus lines 220a-220n which may be collectively referred to as bus lines 220. Each of these lines may be configured to carry a corresponding signal (e.g., clock line 210 may carry a corresponding clock signal.) In various embodiments, a signal on clock line 210 may be used to coordinate the timing of various operations between two devices coupled through the low pin count bus. One or more control lines 215 may be used to transmit control signals for the bus. For example, signals on control lines 215 may identify the channels to be followed by transferred data, indicate the start of a new cycle, termination of a broken cycle, whether a device would like to read or write to memory, an acknowledgment that data is received, what an address refers to, that the bus interface should be reset, etc. It is noted that these examples are not an exhaustive list of possible functions of control lines 215. In various embodiments, bus lines 220 may include five to ten wires which may be used to communicate control, address and data information serially. As used herein, communicating information "serially" refers to the process of sending data one bit at a time, sequentially over bus lines (as opposed, for example, to sending the data all at once in a parallel fashion). Note that, in one embodiment, lines 220 may each operate serially even though information (address, data, etc.) may be sent in parallel over lines 220 taken collectively. In such a configuration, each of lines 220 is communicated serially within the meaning of the present disclosure.

Turning now to FIG. 2B, a diagram illustrating one specific embodiment of a low pin count bus 200 is shown. The specific low pin count bus depicted is INTEL's LOW PIN COUNT (LPC) bus 225. INTEL introduced the LPC bus as a substitute for the Industry Standard Architecture (ISA) bus, and is thus ISA-compatible. Although the LPC bus resembles an ISA bus in terms of the interface it presents, it is quite different physically from an ISA bus. Specifically, the LPC bus implements the functionality of an ISA bus using fewer signals than are used on an ISA bus. Accordingly, the LPC bus is a "reduced pin count bus" as that term is used within the present disclosure. LPC bus 250 contains 7 required (mandatory) signals which are transmitted on 7 bus lines. The required signals are four multiplexed command, address and data signals (shown as reference number 260), an LFRAME# signal 290, LRESET# signal 280, and LCLK signal 270. The LFRAME# signal line 290 is used to indicate the start of a new cycle and termination of a broken cycle (LFRAME# can thus be considered a cycle delimiter signal). The LRESET# signal line 280 is used to reset the LPC interface. LCLK signal 270 provides the clock signal for the bus. The following types of information may be communicated on lines 260: start, stop (abort a cycle), transfer type (memory, I/O, DMA), transfer direction (read/write), address, data, wait states, DMA channel, and bus master grant. For further information regarding the INTEL LPC bus, refer to the Low Pin Count Interface Specification revision 1.1 (2002) provided by INTEL.

Figure 3:
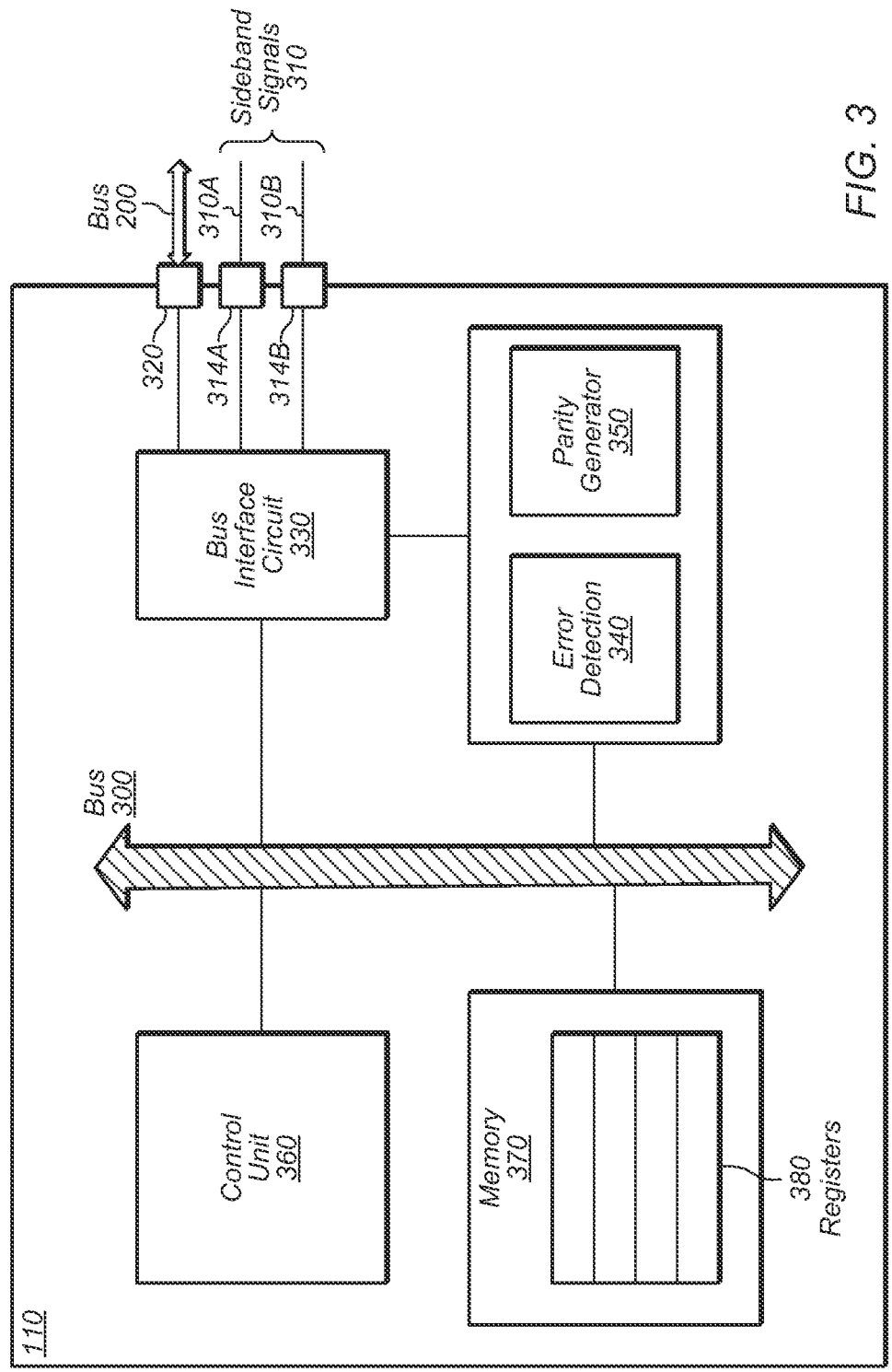
FIG. 3 is a block diagram illustrating a device configured to communicate information over a reduced pin count bus.

Turning now to FIG. 3, a block diagram illustrating a device 110 configured to communicate information over a low pin count bus 200 is shown. Components that correspond to those shown in FIG. 2A are numbered identically for clarity and simplicity. In some embodiments, device 110 may include a control unit 360, a memory element 370 containing registers 380, a bus interface circuit 330, error detection circuitry 340 and parity generation circuitry 350. Control unit 360, memory element 370 and bus interface circuit 330 may be coupled to an internal bus 300. In some embodiments, error detection circuitry 340 and parity generation circuitry 350 may be coupled to the internal bus and the bus interface circuit 330.

In one embodiment, control unit 360 may constitute a central processing unit (CPU) or other processing element for device 110. (As used herein, a "processing element" refers to a circuit that is configured to execute instructions, such as those specified by an instruction set architecture for the processing element.) In various embodiments, control unit 360 may include various numbers of cores, and may contain any known processing element feature (e.g., caches). Additionally, in some embodiments, device 110 may be configured to store data in registers 380 located in memory element 370. Device 110 is not limited to these illustrated components; it may contain different, more, or fewer elements than those illustrated in FIG. 3.

In one embodiment, low pin count bus 200 is coupled to device 110 through bus interface circuit 330. As previously discussed, in some embodiments, low pin count bus 200 may also constitute a reduced pin count bus. In the illustrated embodiment, low pin count bus 200 lacks certain error correction capabilities. For example, in one embodiment, low pin count bus 200 lacks the ability to detect or report errors that may occur during data transmission on the bus (e.g., parity errors). Accordingly, sideband signals 310A and 310B, which may be collectively referred to as sideband signals 310, are used to implement certain error correction capabilities for low pin count bus 200. In the illustrated embodiment, sideband signals are coupled to bus interface circuit 330 through two general purpose input/output (GPIO) pins 314A and 314B. As used herein, a general purpose input/output pin refers to a generic pin on a chip whose behavior (including whether it is an input or output pin) can be controlled through software. As such, GPIO pins 314A and 314B may be programmed to send or receive signals on corresponding sideband lines. Bus interface 330 may also be coupled through pins 320 corresponding to bus 200. By coupling bus interface circuit 330 to pins corresponding to bus 200 as well as sideband signals 310, bus interface circuit 330 is configured to receive and transmit signals from both bus 200 and sideband signals 310. Bus interface circuit 330 is further coupled to error detection circuitry 340 and parity generation circuitry 350.

In the illustrated embodiment, as data is received over low pin count bus 200, parity or error information related to data sent over low pin count bus 200 may be received over sideband signals 310 at pins 314A-B. The error or parity information may then be communicated through bus interface circuit 330 to error detection circuitry 340 for further error processing. Alternatively, as data is transmitted from device 110 over bus interface circuit 330, the parity generation circuitry 350 may generate parity information to be transmitted over sideband signals 310. In some instances, as will be discussed further below, parity information may be sent over bus 200 instead of through sideband signals 310 (sideband signals 310 may then be used for additional types of error data). Two specific embodiments that illustrate how error information may be communicated using sideband signals are discussed further below, with reference to FIGS. 4A and 4B, respectively. As described, FIG. 3 illustrates an exemplary embodiment of a device configured to use a low pin count bus 200 to communicate information and use sideband signals 310 to implement error checking capability that is lacking on low pin count bus 200.

Figure 4A:
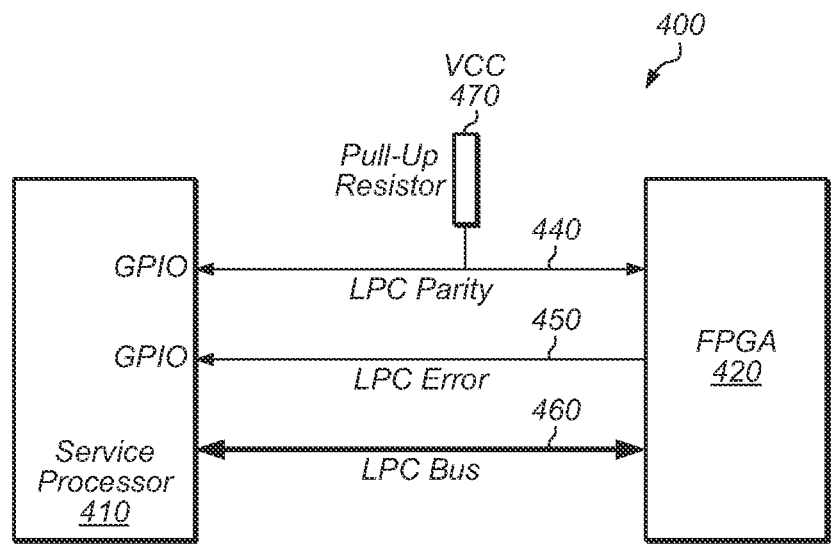
FIGS. 4A and 4B depict different embodiments of a system for communicating error information.

Turning now to FIG. 4A, one embodiment of a system is shown in which two devices are configured to communicate information over a low pin count bus 460 and sideband signals are used to implement error checking capability on low pin count bus 460. In system 400, service processor 410 is coupled to an FPGA 420 through low pin count bus 460. (Note that although device 420 is shown as an FPGA, it can be any suitable device in alternate embodiments.) In this exemplary embodiment, low pin count bus 460 lacks error detection capability; sideband signals are thus used to implement the capability to check for errors that may occur during data transmission on low pin count bus 460. In the illustrated embodiment, the sideband signals are LPC parity line 440 and LPC Error line 450. Additional error lines may be included in other embodiments. In one embodiment, LPC Error line 450 is a unidirectional line driven by FPGA 420 and LPC parity line 440 is a bidirectional line that may be driven both by FPGA 420 and service processor 410. In the illustrated embodiment, both devices 410 and 420 have open collector drivers; additionally, pull-up resistor 470 is coupled to LPC parity line 440. As used herein, an "open collector" indicates that the bus signals cannot be driven high; they can only be driven low. As such, a pull up resistor is typically used to pull the bus lines high, permitting shared use.

Figure 4B:
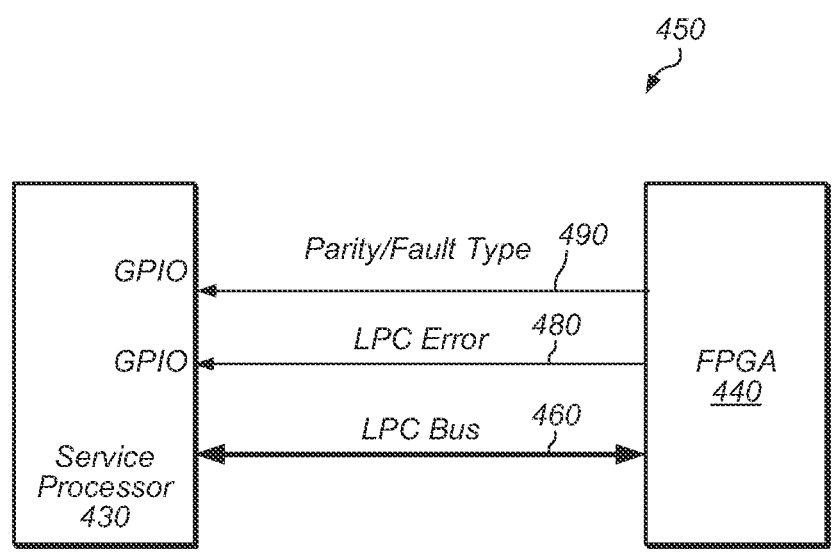

Both FIGS. 4A and 4B depict embodiments in which error checking capabilities are implemented on a low pin count and/or reduced pin count bus coupled between two or more devices. FIG. 4A depicts an embodiment in which parity information is communicated using the LPC Parity line 440. FIG. 4B depicts an embodiment in which parity information is communicated on the low pin count bus itself. These embodiments are thus referred to herein as the "LPC Parity Line Implementation" and the "LPC Bus Implementation," respectively.

In a general sense, the term "parity" refers to sameness. A bus may implement a parity convention in which the number of 1's or 0's on the bus plus the parity line is the same on each transaction. For example, in an even parity convention, the number of 1's in each transaction is even, with the parity line being set to 1 or 0 as needed. An odd parity convention is implemented similarly, except that the number of 1's on the bus plus the parity line is odd. This information permits a receiving device to perform a type of error checking, since the receiving device can determine whether the expected parity is present for a given transaction and, if not, indicate that an error occurred in the transmission. In the context of the present disclosure, "parity information" refers to information relating to parity-based error checking as described above. For example, "parity information" includes an indication of a parity error, as well as a parity bit for a given set of data. "Parity error information," on the other hand, includes any information relating to the presence of a parity error (e.g., the indication of the error itself).

Continuing with FIG. 4A, in one embodiment, service processor 410 and FPGA 420 use low pin count bus 460 to transfer data. For example, during one embodiment of a read cycle protocol, service processor 410 may transmit a read request containing information specifying the type, direction, address, and data size of the requested data to FPGA 420. As used herein, direction indicates which direction the data is being transferred between the two devices. In this embodiment, when service processor 410 drives the read request over low pin count bus 460, it also drives parity information related to the read cycle data over LPC parity line 440.

In the illustrated embodiment, FPGA 420 receives the read request over low pin count bus 460 and parity information over the LPC parity signal 440. FPGA 420 may then calculate, over the entire read cycle, parity information in order to determine whether an expected parity is present. If FPGA 420 detects a parity error, it may signal that an error occurred to the service processor 410 by driving a signal using the LPC error line 450. FPGA 420 may indicate an error was detected by setting the LPC error line 450 to some predetermined value which indicates that an error was detected by the FPGA 420. For example, in certain embodiments, FPGA 420 may drive a high signal on LPC error line 450 to indicate that it detected an error. In other embodiments, FPGA 420 may drive a low signal on LPC error line 450 to indicate that it detected an error.

After an error is detected, FPGA 420 may proceed with subsequent error processing. For example, in one embodiment, once FPGA 420 detects that an error is detected, FPGA 420 drops the cycles in which a parity error occurred. In certain embodiments, whether or not cycles are dropped may depend on a setting in one of a plurality of registers managed by FPGA 420. For example, one of these registers may be configured to indicate whether FPGA 420 should proceed with subsequent error processing. For example, a register may include a bit that indicates to FPGA 420 that it should drop any cycles during which a parity error occurred. In a similar fashion, once a device such as service processor 410 determines that a value driven on LPC error line 450 indicates that an error occurred, service processor 410 may also proceed with subsequent error processing. For example, service processor 410 may be configured to resend data that previously generated a parity error.

Continuing with example described above, in one embodiment, if FPGA 420 does not detect an error in the read request, after obtaining the requested data, it may proceed to drive return data over bus 460. During the communication of this read data, FPGA 420 may also drive parity information related to the read data over LPC parity line 440. In one embodiment, service processor 410 may check for parity errors using the parity information received over LPC parity line 440. In this example, if the read cycle were instead a write cycle, FPGA 420 would have no return data to drive over low pin count bus 460. In such a situation, FPGA 420 would not drive any parity information over LPC parity line 400.

In this illustrated embodiment, parity information is sent using LPC parity line 440. LPC parity line may thus be used by both service processor 410 and FPGA 420. In the LPC Bus Implementation, discussed next with respect to FIG. 4B, an embodiment is discussed in which parity information may be sent using LPC bus 460. Furthermore, in the next embodiment, both parity errors and other request faults may be detected and reported.

Turning now to FIG. 4B, an embodiment of the LPC Bus Implementation is shown, in which sideband signals are implemented to detect both parity and other faults. Additionally, in this embodiment, a portion of a transaction on LPC bus 460 may be used to transfer parity information. Service processor 430 may be coupled to FPGA 440 through low pin count bus 460. (Again, the designations "service processor" and "FPGA" are exemplary; any device capable of interfacing to low pin count bus 460 may be used instead.) As low pin count bus 460 lacks error detection capability, in this embodiment, sideband signals are used to implement this capability. In FIG. 4B, two sideband signals Parity/Fault type 490 and LPC error line 480 are used. In one embodiment, the two sideband signals 480 and 490 may be unidirectional lines driven by FPGA 440. Details of how these sideband signals may be used to indicate to service processor 430 that a parity error or a request fault has been detected are discussed below.

In one embodiment, service processor 430 and FPGA 440 may communicate information to each other over low pin count bus 460. For example, during a read cycle, service processor 430 may transmit a read request. Similar to the previous example, a read request may contain data regarding the type, direction, address, and data size of the requested data to FPGA 440.

When service processor 430 drives the read request over low pin count 460, it may also drive parity information over the low pin count bus 460. In one embodiment, the parity information is sent over the low pin count bus 460 using unused address bits in the read request. As one example, consider an embodiment in which 32 address bits are available, but only 28 address bits are actually used by processor 430 in sending a read request to FPGA 440. In such an embodiment, the four (4) unused address bits may be used to transfer parity information instead.

In the illustrated embodiment, FPGA 440 receives both the read request and parity information through low pin count bus 460. FPGA 440 may then calculate, over the entire read cycle, parity information in order to determine whether an expected parity is present. In one embodiment, FPGA 440 may be configured to not only detect parity errors, but also other types of errors. For example, FPGA 440 may be configured to detect, in various embodiments, different types of errors including, but not limited to, unsupported cycles, invalid cycle requests/cycle invalids, and illegal writes. In some embodiments, unsupported cycles are cycles in which requests are made with the bus protocol which a receiving device does not support. An invalid cycle request or cycle invalid may occur when the parity is correct but the cycle type is invalid per the bus protocol or is not supported by the receiving device. Illegal writes may occur, for example, when a requesting device sends a write request to a read-only location. These types of errors may be referred to generally as requests faults, which are distinguished within the present disclosure from parity errors. The term "error condition" is used herein to generally to refer to any type of error, including a parity error, request fault, etc.

In an exemplary embodiment, sideband lines Parity/Fault Type 490 and LPC Error 480 may be used to indicate to service processor 430 that FPGA 440 has detected either a parity error or a request fault. For example, in the illustrated embodiment, if FPGA 440 detects either a request fault or a parity error, it may generally indicate that an error was detected by driving a signal on LPC error line 480. FPGA 440 may then indicate which type of error was detected by driving a signal corresponding to the type of error detected on Parity/Fault Type line 490. In one specific embodiment, if FPGA 440 detects a parity error, it may drive LPC error line 480 high and Parity/Fault Type line 490 low. Alternatively, if FPGA 440 detects a request fault, it may drive both LPC error line 480 and Parity/Fault type line 490 high. Accordingly, in this embodiment, line 480 may be used generally to indicate an error, while line 490 may be used to indicate a type of the error.

In a read cycle, if FPGA 440 does not detect a request fault type or parity error associated with the read request, it may proceed to drive return data over low pin count bus 460. During the communication of this read data, FPGA 440 also drives parity information corresponding to the read data over Parity/Fault type line 490. Service processor 430 may then check for parity errors using the data received via bus 460 and the parity information received over Parity/Fault type line 490.

Two different embodiments for implementing error checking capabilities have been described with reference to FIGS. 4A and 4B (the "LPC Parity Line Implementation" and "LPC Bus Implementation," respectively). FIGS. 5A-5D, which are described next, are exemplary flow diagrams of methods that utilize sideband signals to indicate whether an error has been detected on a low pin count bus. More specifically, FIGS. 5A and 5B correspond to methods that may be used by devices configured as described above with reference to FIG. 4A (the LPC Parity Line Implementation). FIGS. 5C and 5D correspond to methods that may be used by devices configured as described above with reference to FIG. 4B (the LPC Bus Implementation).

Figure 5A:
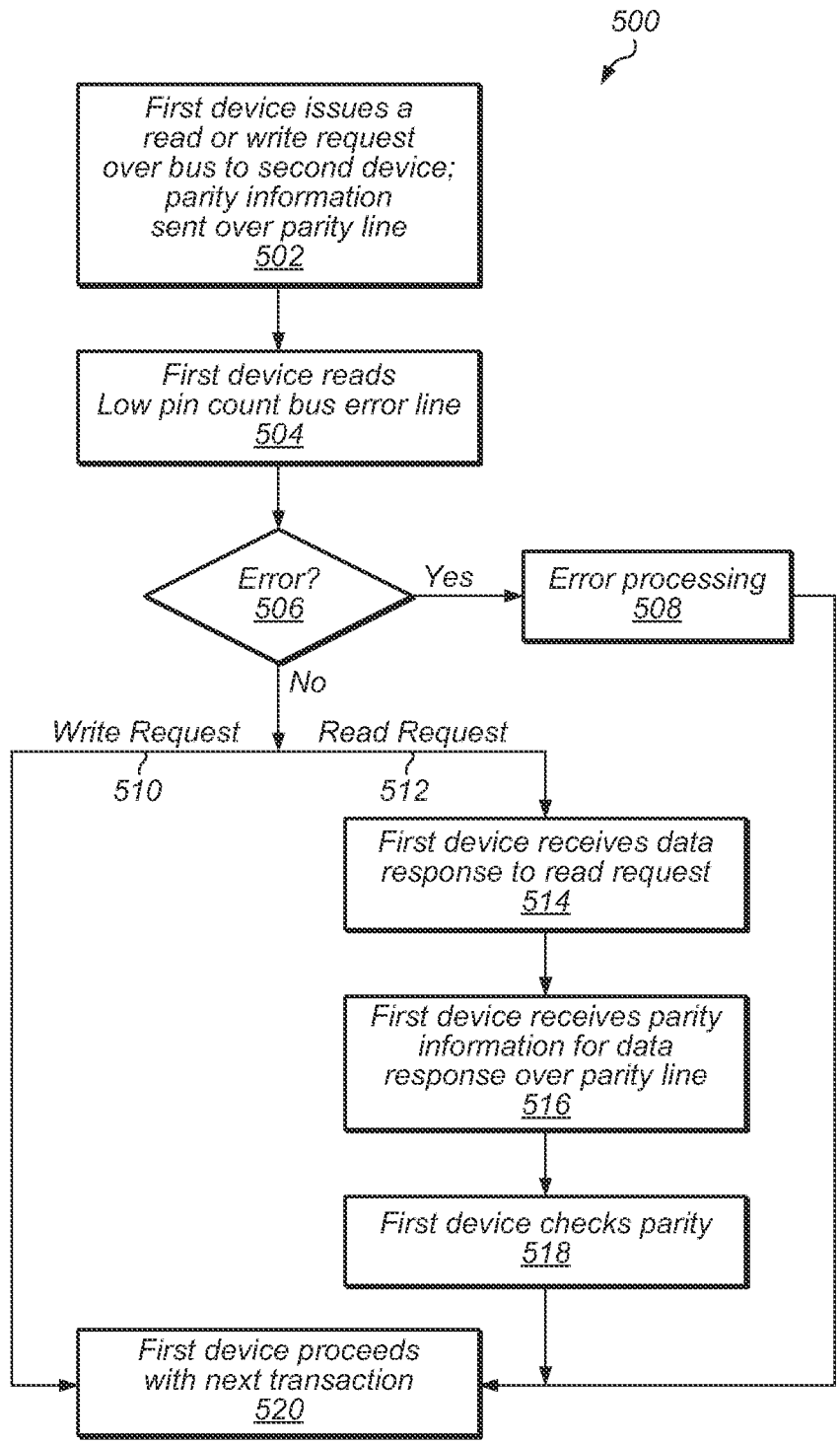
FIGS. 5A-D are flow diagrams illustrating embodiments of methods for communicating error information on a bus.

Turning now to FIG. 5A a flow diagram illustrating one embodiment of a method 500 for communicating error information is shown. Method 500 may be performed by any device issuing a bus transaction (e.g., service processor 410 as described above with reference to FIG. 4A issuing a read or write request). More specifically, FIG. 5A corresponds to a method that may be used by an issuing device configured to implement the LPC Parity Line Implementation. In various embodiments, some of the blocks shown in FIG. 5A may be performed concurrently, in a different order than shown, or omitted. Additional method elements may also be performed as desired. Flow begins at block 502.

At block 502, a first device (e.g., a processing element) issues a read or write request over a low pin count bus to a second device. These devices may also be referred to as the "issuing device" and the "receiving device." The issuing device also drives parity information related to the read or write cycle over a parity line. In one embodiment, the parity line is a sideband line such as LPC Parity Line 440 described above with reference to FIG. 4A. In one implementation, the issuing device may be service processor 410 and the receiving device may be FPGA 420. Flow proceeds to block 504.

At block 504, the issuing device reads a low pin count bus error line. The low pin count bus error line may be sideband signal 450 as described above with reference to FIG. 4A. The low pin count bus error line may be driven by the receiving device to indicate whether an error was detected in the read or write request received by the receiving device. Flow proceeds to decision block 506.

At decision block 506, flow will branch depending on whether an error is detected. If no error is detected, flow proceeds depending on whether the issuing device issued a read request or write request. If the issuing device issued a write request, flow proceeds through branch 510 to block 520, in which the issuing device proceeds with the next transaction. Alternately, if the issuing device issued a read request, flow proceeds through branch 512 to block 514.

At block 514, the issuing device receives a data response on the low pin count bus according to the read request. Flow proceeds to block 516.

At block 516, the issuing device also receives parity information associated with the data that is supplied by the receiving device. This parity information is received on the sideband line designated for communicating parity information. In one embodiment, the information received in blocks 514 and 516 may be received in parallel. Flow proceeds to block 518.

At block 518, the issuing device checks parity by calculating the parity of the data received in block 514 and comparing it to the parity information received in block 516. In one embodiment, the issuing device may be configured to check for even parity. Flow proceeds to block 520. As discussed above, at block 520, the issuing device may then proceed with the next bus transaction, if applicable.

Returning to decision block 506, if the issuing device determines that an error is present, flow proceeds to block 508, in which error processing may be performed. In certain embodiments, error processing may consist of the issuing device resending the data. Alternatively, error processing may involve reporting of the error (e.g., by recording an indication of the error in some register). Flow then proceeds to block 520.

Figure 5B:
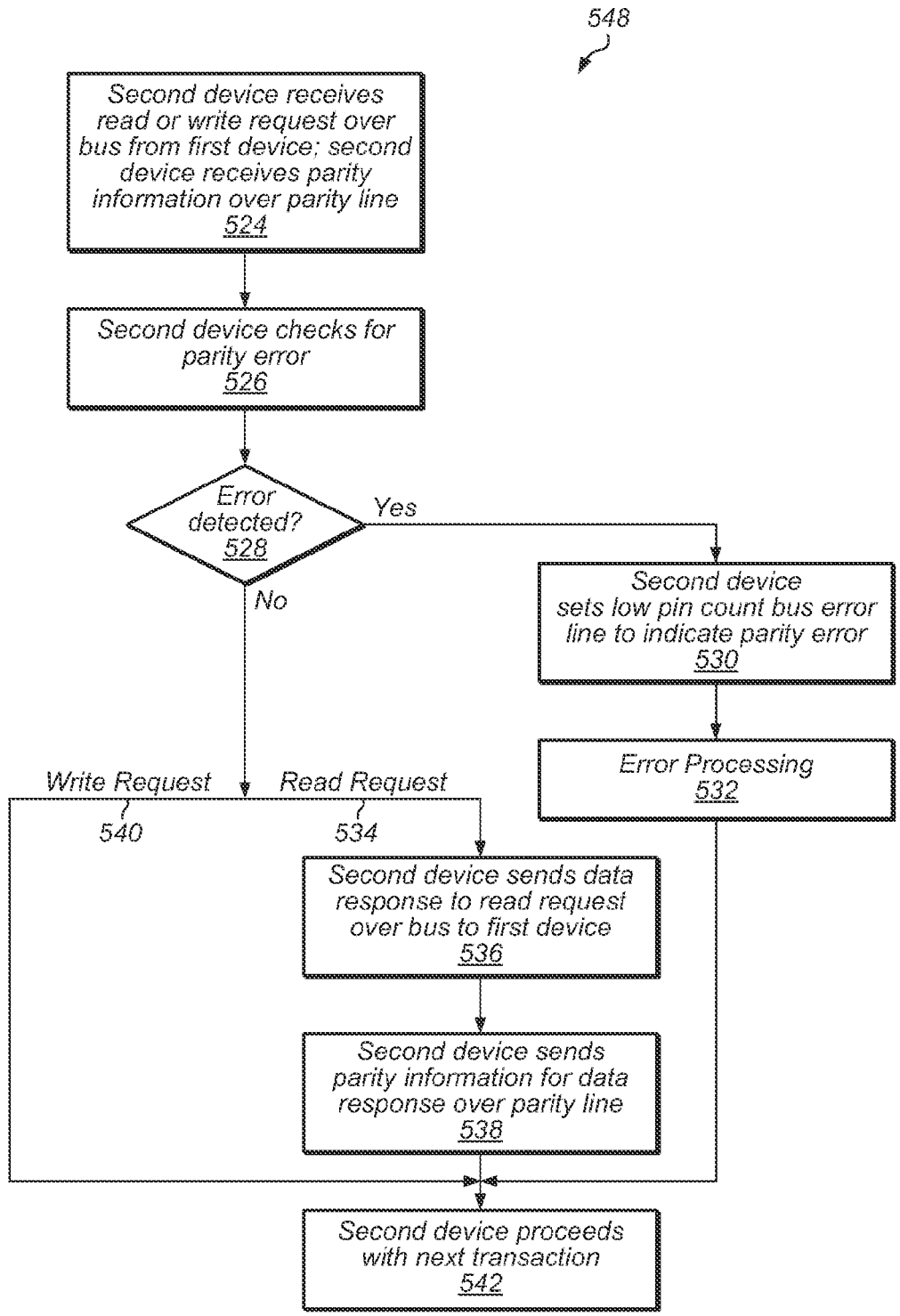
Figure 5C:
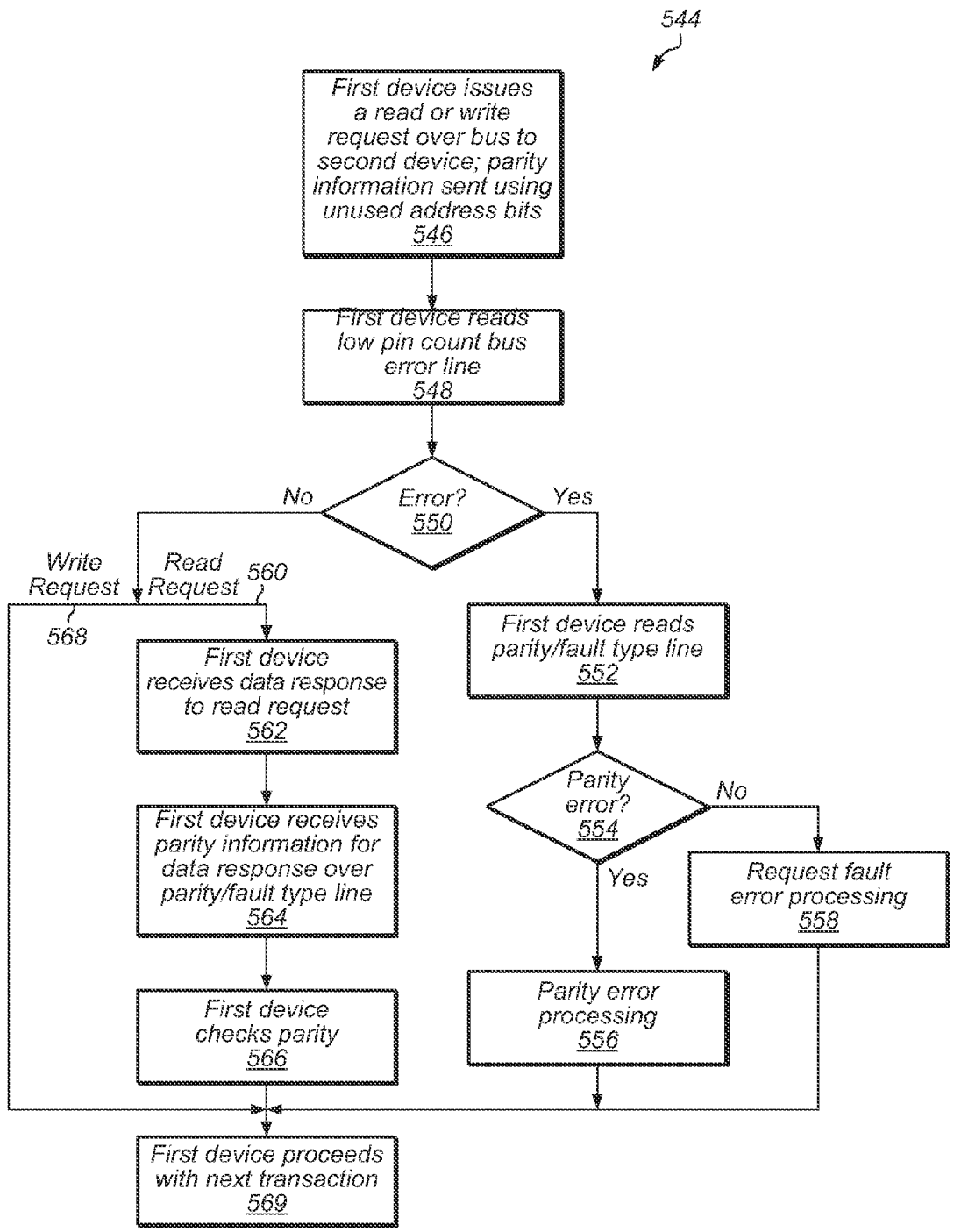
Figure 5D:
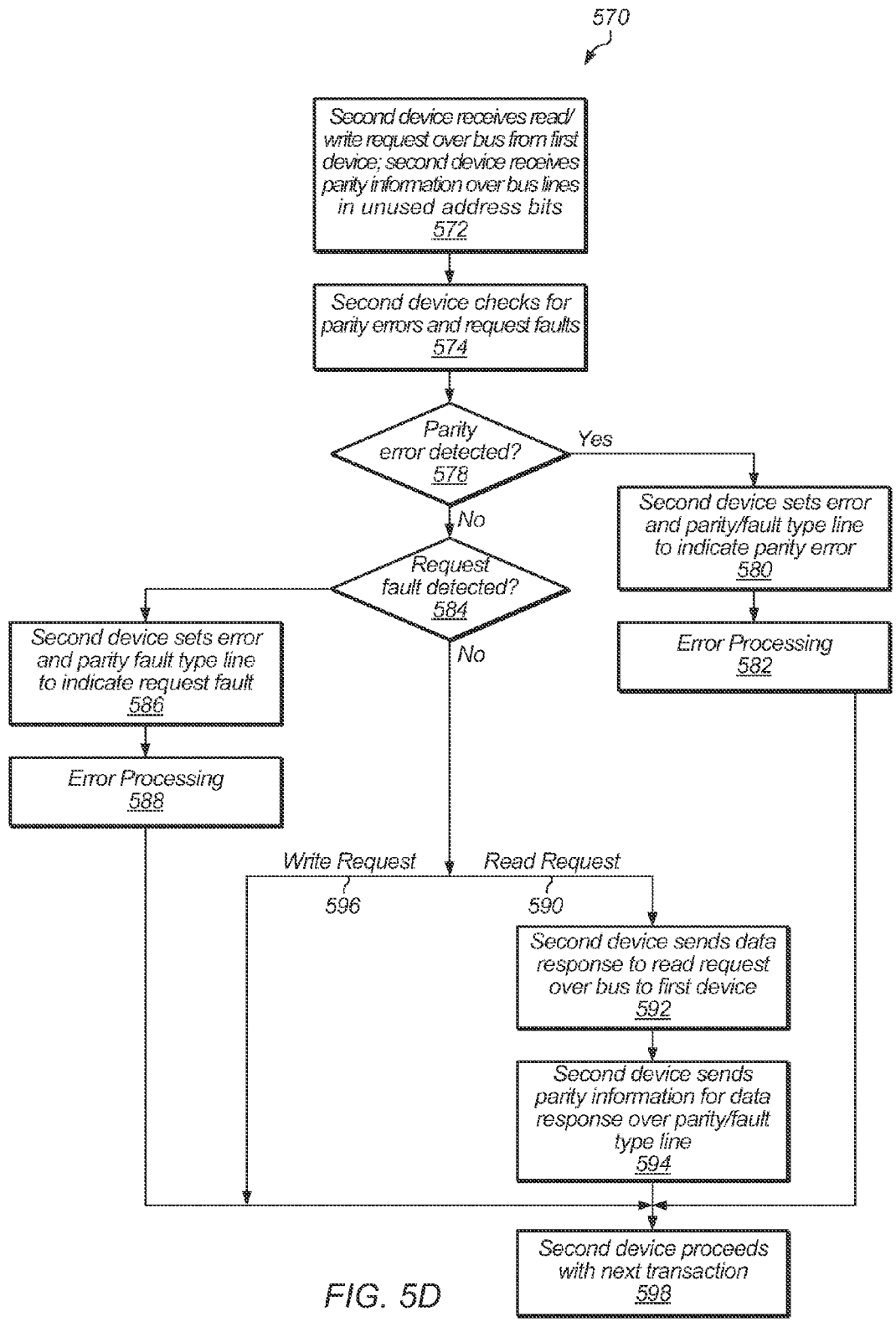

Turning now to FIG. 5B, a method that may be performed by a device receiving a request from another device (e.g., the issuing device of FIG. 5A) is shown. In various embodiments, some of the blocks shown in FIG. 5B may be performed concurrently, in a different order than shown, or omitted. Additional method elements may also be performed as desired. Flow begins at block 524.

At block 524, a receiving device receives a read or write request over a low pin count bus from an issuing device. In one embodiment, both devices are utilizing sideband signals configured to indicate whether an error has been detected on low pin count bus according to the LPC Parity Line Implementation described above with reference to FIG. 4A. At block 524, the receiving device also receives parity information over a parity line. In one embodiment, the parity line is a sideband line such as LPC Parity Line 440 described above with reference to FIG. 4A. Flow proceeds to block 526.

At block 526, the receiving device checks for a parity error. In one embodiment, the receiving device may be configured to calculate, over the entire read or write cycle, the parity of information received on the low pin count bus. Flow proceeds to decision block 528.

At decision block 528, the receiving device determines whether a parity error occurred. The receiving device may use the calculated parity value from block 526 to determine whether a parity error occurred during data transmission. At decision block 528, flow will branch depending on whether an error is detected. If no error is detected, flow proceeds depending on whether the receiving device received a read request or write request. If the request is a write request, flow proceeds through branch 540 to block 542, in which the receiving device proceeds with the next bus transaction. Alternatively, if the request is a read request, flow proceeds through branch 534 to block 536.

At block 536, the receiving device sends read data according to the read request received over the low pin count bus. Flow proceeds to block 538.

At block 538, the receiving device drives parity information associated with the read data over the sideband line designated for communicating parity information. In one embodiment, the information transmitted in blocks 536 and 538 may be transmitted in parallel. Flow proceeds to block 542, in which the receiving device proceeds with the next bus transaction.

Returning to decision block 528, if the receiving device determines that an error is present, flow proceeds to block 530. At block 530, the receiving device sets a low pin count error line to indicate a parity error was detected. In one embodiment, low pin count error line is a sideband line such as LPC error line 450 described above with reference to FIG. 4A. Flow proceeds to block 532.

At block 532, the receiving device proceeds with subsequent error processing. In certain embodiments, the receiving device may drop any cycles in which a parity error was detected. In certain embodiments, the error processing may consist of the receiving device receiving a second read request resent by the issuing device in response to the error detected during the first read request. The receiving device may then proceed to return read data if no subsequent errors are detected. Flow then proceeds to block 542, in which the receiving device may proceed with the next transaction.

FIGS. 5A and 5B depict methods that may be used by devices using the LPC Parity Line Implementation described above with reference to FIG. 4A. FIGS. 5C and 5D, described next, illustrate methods that may be used by devices using the LPC Bus Implementation described above with reference to FIG. 4B.

Turning now to FIG. 5C, a flow diagram illustrating one embodiment of a method 544 for communicating error information is shown. Method 544 may be performed by any device issuing a bus transaction (e.g., service processor 430 as described above with reference to FIG. 4B issuing a read or write request). More specifically, FIG. 5C corresponds to a method that may be used by an issuing device using the LPC Bus Implementation described above with reference to FIG. 4B, in which sideband signals are used to indicate both parity and request fault errors. In various embodiments, some of the blocks shown in FIG. 5C may be performed concurrently, in a different order than shown, or omitted. Additional method elements may also be performed as desired. Flow begins at block 546.

At block 546, a first device (e.g., an "issuing device" such as a processing element) issues a read or write request over a low pin count bus to a second device. The issuing device transmits parity information over the low pin count bus as well. In one embodiment, the issuing device transmits parity information related to the read request using unused address bits in the read request. In an exemplary read request protocol, 32 address bits are available, but only 28 address bits are actually used by the first device in sending a read request. In such an embodiment, the 4 unused address bit may be used to transfer parity information instead. Flow proceeds to block 548.

At block 548, the issuing device reads a low pin count bus error line. The low pin count bus error line may be sideband signal 450 described above with reference to FIG. 4B. In this embodiment, the low pin count bus error line is used to indicate to the first device whether an error has been detected by the receiving device. In this embodiment, two types of errors are capable of being detected: parity errors and request faults. If low pin count bus error line 480 is set to indicate an error was detected, one of these two types of errors are present. Flow proceeds to decision block 550.

At decision block 550, flow will branch depending on whether an error is detected. If no error is detected, flow proceeds depending on whether the issuing device issued a read request or write request. If the issuing device issued a write request, flow proceeds through branch 569 to block 568. At block 568, the issuing device may proceed with the next transaction. Alternatively, if the issuing device issued a read request, flow proceeds through branch 560 to block 562.

At block 562, the issuing device receives data on the low pin count bus according to the read request. Flow proceeds to block 564.

At block 564, the issuing device receives, on a sideband signal, parity information corresponding to the data received from the receiving device over the low pin count bus. This sideband line used by the first device to receive parity information may be sideband signal Parity/Fault Type 490 described above with reference to FIG. 4B. In one embodiment, the information received in blocks 562 and 564 may be received in parallel. Flow proceeds to block 566.

At block 566, the issuing device checks parity by calculating the parity of the data received in block 562 and parity bit information received in block 564. In one embodiment, the issuing device may be configured to check for even parity. Flow then proceeds to block 568. As discussed above, at block 568, the first device proceeds with the next transaction.

Returning to decision block 550, if the issuing device determines that an error is present, flow proceeds to block 552. At block 552, the issuing device determines the type of error that was detected (e.g., a parity error or a request fault). In one embodiment, this determination may be made based on whether a parity/fault type line is set high or low. In one embodiment, parity/fault type line is sideband line Parity/Fault type 490 described above with reference to FIG. 4B. Flow proceeds to decision block 554.

At decision block 554, flow will branch depending on the type of error detected. If a request fault occurred, flow proceeds to block 558, in which the issuing device proceeds with request fault error processing. In one embodiment, the issuing device may use the low pin count bus to transmit a request for more details on the type of error that occurred. This information may be used for subsequent debugging in some instances.

Returning to decision block 554, if a parity error is detected, flow proceeds to block 556. In block 556, subsequent parity error processing may be performed. In certain embodiments, error processing may consist of the issuing device resending the data. Flow then proceeds to block 568, in which the issuing device may proceed with a subsequent transaction.

Turning now to FIG. 5D, one embodiment of a method that may be used by a device receiving a request from the issuing device of FIG. 5C is shown. Method 570 may be performed by any device receiving a bus transaction (e.g., FPGA 440 as described above with reference to FIG. 4B). In various embodiments, some of the blocks shown in FIG. 5D may be performed concurrently, in a different order than shown, or omitted. Additional method elements may also be performed as desired. Flow begins at block 572.

At block 572, a receiving device receives a read or write request over a low pin count bus from an issuing device. In one embodiment, both of these devices utilize sideband signals configured to indicate whether a request fault or parity error has occurred. In one embodiment, the issuing device may be a processing element such as service processor 430 and the receiving device may be FPGA 440 as discussed with reference to FIG. 4B. The receiving device may receive parity information over the low pin count bus using the unused address bits in a read or write cycle. Flow proceeds to block 574.

At block 574, the receiving device checks for errors. In one embodiment, the receiving device may be configured to check for even parity of the data received on the low pin count bus. Flow proceeds to decision block 578.

At decision block 578, the receiving device determines whether a parity error occurred by using the calculated parity value from block 574. At decision block 578, flow will branch depending on whether a parity error is detected. If there is no parity error, flow proceeds to decision block 584 in which the receiving device determines whether a request fault is detected.

If a request fault is not detected, flow proceeds depending on whether the receiving device received a write request or a read request. If the receiving device received a read request, flow proceeds through branch 596 to block 598. At block 598, the receiving device may proceed with a subsequent transaction.

Returning to decision block 584, if the receiving device receives a read request, flow proceeds through branch 590 to block 592.

At block 592, the receiving device drives read data according to the read request received over the low pin count bus. Flow proceeds to block 594.

At block 594, the receiving device drives parity information for the read data on the sideband line, (e.g., Parity/Fault type line 490 as discussed with reference to FIG. 4B). In one embodiment, the information in blocks 592 and 594 may be transmitted in parallel. Flow proceeds to block 598, in which the receiving device proceeds with the next transaction.

Returning to decision block 584, if a request fault is detected, flow proceeds to block 586. At block 586, the receiving device sets the parity fault type line to indicate that a request fault was detected. In one embodiment, this may be accomplished by generally indicating an error using LPC error line 480, and further indicating that the error type is a request fault using Parity/Fault type line 490 as discussed with reference to FIG. 4B. Flow proceeds to block 588.

At block 588, the receiving device proceeds with subsequent error processing related to the detected request fault. In an exemplary embodiment, a request fault may include various types of access errors. An access error may occur, for example, if the issuing device sends a request that includes an illegal address. In one embodiment, as part of the error processing at block 588, the receiving device may maintain designated registers in which it stores information pertinent to the type of request fault that occurred. Flow proceeds to 598, in which the second device may proceed with a subsequent transaction.

Returning to decision block 578, if a parity error is detected by the receiving device, flow proceeds to block 580. At block 580, the receiving device sets the parity fault type line to indicate that a parity fault was detected. In one embodiment, this may be accomplished by generally indicating an error using LPC error line 480, and further indicating that the error type is a parity error using Parity/Fault type line 490 as discussed with reference to FIG. 4B. Accordingly, when line 480 is set, one value on line 490 may be used to indicate a request fault; the other value may be used to indicate a parity error. Flow proceeds to block 582.

At block 582, the receiving device proceeds with subsequent error processing. In certain embodiments, the receiving device may drop any cycles in which a parity error was detected. In certain embodiments, the error processing may consist of the receiving device receiving a second read request resent by the issuing device in response to the error detected during the first transaction. The receiving device may then proceed to return read data if no subsequent errors are detected. Flow proceeds to block 598, in which the receiving device proceeds with the next transaction.

Figure 6A:
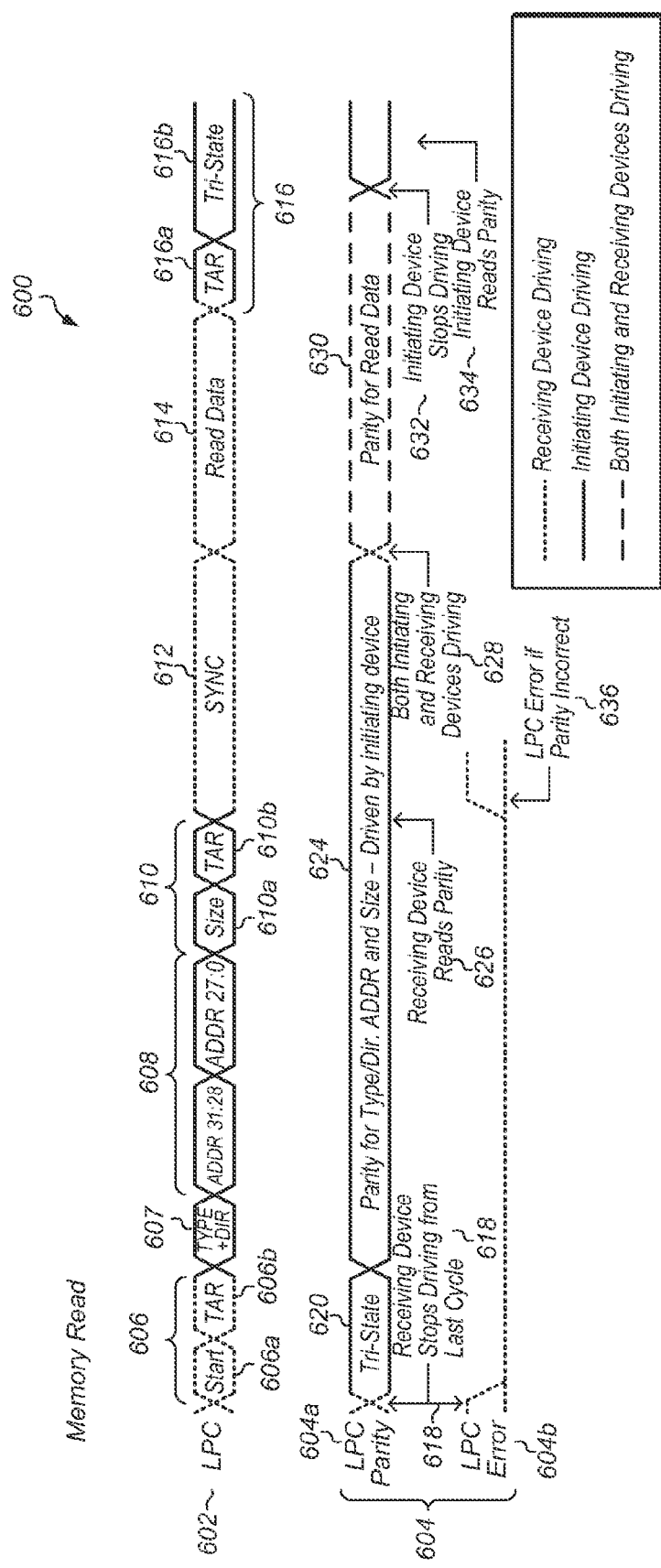
FIGS. 6A-C are exemplary timing diagrams for bus transactions that may be performed by devices such as those depicted in FIGS. 4A and 4B.

Turning now to FIG. 6A, a timing diagram 600 illustrating possible timing characteristics for a memory read is shown. Timing diagram 600 depicts a scenario in which a first device (e.g., service processor 410 or 430), which may be configured as a slave, initiates a memory read to a second device (e.g., FPGA 430 or 440) which may be configured as a master, via a low pin count bus and associated sideband signals used to convey error information. In this example, the low pin count bus may be low pin count bus 200 described above with reference to FIG. 2A. Additionally, the sideband signals may be configured such that they are used to transmit parity and error information as described previously with reference to the LPC Parity Line Implementation.

As shown, timing diagram 600 includes low pin count bus lines (LPC) 602, LPC parity line 604a and an LPC error line 604b. LPC parity line 604a and LPC error line 604b may be collectively referred to as sideband lines 604. In various embodiments, sideband lines 604 may correspond to LPC parity line 440 and LPC error line 450 as described above with reference to the LPC Parity Line Implementation.

In the example shown, a memory read transaction that uses various cycle types to convey data related to the memory read is illustrated. In this example, the timing diagram depicts initial introductory cycles in the group of cycles 606. These introductory cycles include a start cycle 606a in which the initiating or issuing device, configured as a slave, gains access to the low pin count bus 602. During the turn-around (TAR) cycle 606b, the receiving device, configured as the master, grants bus control of the low pin count bus to the initiating device. Once the initiating device gains control of the bus, it strobes type and direction data on to the low pin count bus during type+dir cycle 607. In this exemplary embodiment, type+dir cycle 607 specifies whether the cycle type is a memory, I/O, or directory memory access (DMA) request. The direction specifies whether the request is a read or write, for example. In other embodiments, various other types of information may be included within the initial introductory cycles depicted as cycles 606. The initiating device then begins driving address information during cycle 608, followed by size information during cycle 610*a* and another turn-around cycle 610*b*.

In the embodiment shown, during the beginning of the introductory cycles 606, LPC parity signal 604*a* is tri-stated, as indicated by reference numeral 620. As type+dir cycle 607 is transmitted on LPC 602, the initiating device begins driving parity data on line 604*a*. That is, the initiated device drives parity data for the information communicated in type+dir cycle 607, address cycles 608, and size cycles 610*a* depicted as cycles 624 on the LPC parity signal 604*a*.

After cycles 606, 607, 608, and 610, the initiating device releases control of lines 602 and the receiving device (e.g., FPGA 430 or 440) regains control of lines 602. At this point, the receiving device reads the parity information driven by the initiating device on LPC parity line 604*a*. In the embodiment shown, the receiving device drives a signal indicating whether a parity error was detected on LPC error signal 604*b*. During this time, the receiving device drives one or more sync cycles 612 on LPC signal 602. The purpose of sync signals 612 in one embodiment is to stall the low pin count bus until the receiving device is ready to return read data.

At the end of sync cycles 612, the receiving device drives read data (i.e., the data requested by the initiating device) during read cycles 614 on LPC signal 602. At the same time, the receiving device also drives parity information for the read data on LPC parity line 604*a* during cycle 630. Following the end of the read data cycle 614 on the LPC signal 602, another TAR cycle 616*a* may be driven, followed by tri-stating of the line in cycle 616*b*. During the tri-state cycle 616*b*, the initiating device reads the parity information from LPC parity line 604*a*.

Figure 6B:
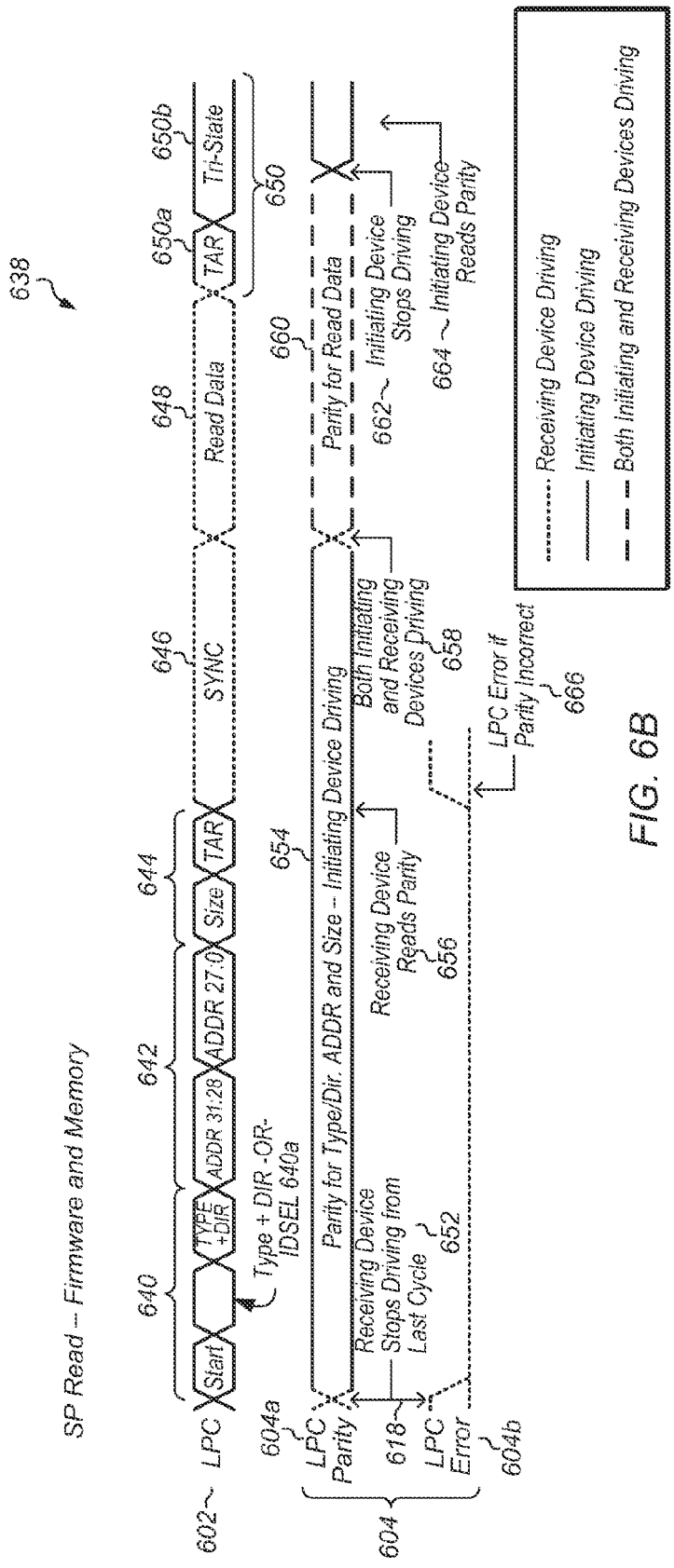

Turning now to FIG. 6B, an exemplary timing diagram depicting a first device configured as a master and a second device configured as a slave is shown. Similar to the scenario depicted in FIG. 6A, the first device is initiating a read request. Additionally, similar to the scenario depicted in FIG. 6A, sideband signals 604 are utilized in a manner described above with reference to the LPC Parity Line Implementation. Thus, the only difference between FIGS. 6A and 6B is that in FIG. 6B a TAR cycle is unnecessary after the initial start cycle. This is due to the fact that the initiating device is configured as a master and thus it does not need a TAR cycle (in which it is given access to the low pin count bus). As configured in this embodiment, the initiating device already has control of the low pin count bus. Instead, cycle 640*a* may be used as a type+dir cycle or an IDSEL cycle. In the exemplary embodiment, an IDSEL cycle is used to indicate which of multiple firmware components is being selected. Otherwise, as timing diagram is depicted in FIG. 6B, it is similar to the timing diagram discussed above with reference to FIG. 6A.

Figure 6C:
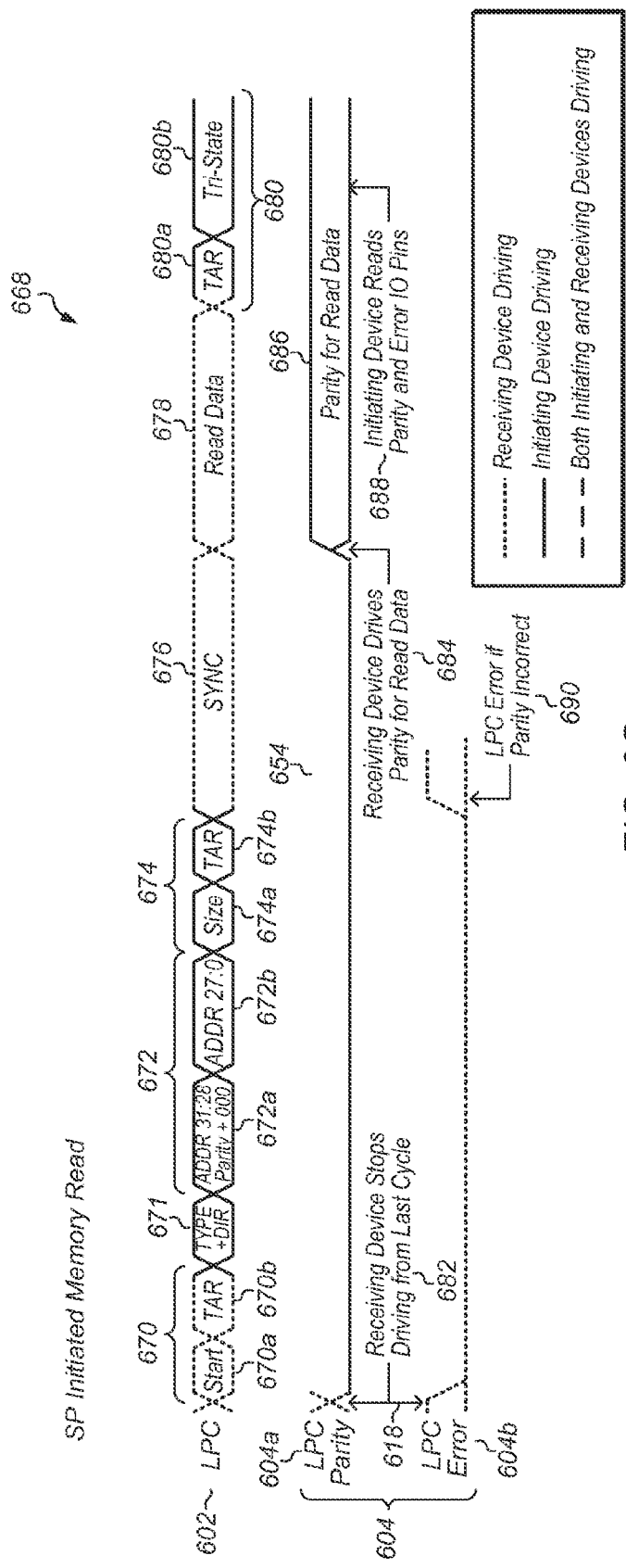

Turning now to FIG. 6C, an exemplary timing diagram depicting two devices utilizing sideband signals 604 in a manner described with reference to the LPC Bus Implementation described above with reference to FIG. 4B is shown. FIG. 6C depicts a scenario in which a first device (e.g., service processor 410 or 430), configured as a slave, initiates a memory read to a second device (e.g., FPGA 430 or 440), configured as a master, via a low pin count bus and associated sideband signals. As in FIGS. 6A and 6B, low pin count bus may be low pin count bus 200 as described above with reference to FIG. 2A. In this embodiment, if the receiving device detects either a parity error or request fault, it drives signals during cycles 692 and 690 on LPC Parity signal 604*a* and LPC error signal 604*b* respectively.

In FIG. 6C, the introductory cycles 670 and type+dir cycle 671 perform the same functions as those discussed above with reference to FIG. 6A. The difference in FIG. 6C begins with address cycle 672*a* sent on LPC 602. Unlike in FIG. 6A, in which parity information was sent using the LPC Parity line 604, in this embodiment, the initiating device drives parity information during address cycle 672*a*. The initiating device then drives address information during address cycle 672*b*.

During the course of this read transaction, the receiving device maintains control of the LPC error line 604*b*. After the initiating device drives TAR cycle 674*b* on LPC 602, the receiving device indicates whether a parity error or request fault was detected during cycles 690 and 692 on LPC error signal 604*b* and LPC Parity signal 604*a* respectively. During this time, the receiving device drives one or more sync cycles 676 on LPC signal 602. Similar to FIG. 6A, the purpose of the sync signals in FIG. 6C is to stall the low pin count bus until the receiving device is ready to return read data. As was discussed above, the receiving device may be configured to respond in various ways once an error is detected. In certain embodiments, in the event that an error is detected, no data is returned by the receiving device. As such, subsequent cycles 678 and 686 do not occur. In the illustrated diagram, if no error is detected, the receiving device will return read data during cycle 678 on LPC 602 and parity for read data during cycle 686 on LPC Parity signal 604*a*. The subsequent cycles following the end of sync cycles 676 are similar to those described with reference to FIG. 6A above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a communication bridge device including a bus interface circuit configured to couple to a service processor via a serial bus and first and second sideband signal lines for the serial bus, wherein the serial bus is a low pin count bus that has less than 10 signal lines, wherein the serial bus includes a set of address/data signal lines, a clock signal line, a reset signal line, and a cycle delimiter signal line, and wherein the serial bus is compatible with an Industry Standard Architecture (ISA) bus;

wherein the bus interface circuit is further configured to use the first and second sideband signal lines to communicate error information in response to detecting an error condition on the serial bus, wherein the bus interface circuit is configured to communicate parity error information on the first and second sideband signal lines in response to detecting a parity error condition on the serial bus; and wherein the communication bridge device is configured to convey at least a portion of the parity error information during an addressing portion of a response to a bus transaction corresponding to address bits that are unused by the response to the bus transaction.

2. The apparatus of claim 1, wherein the bus interface circuit is configured to multiplex address and data information on the set of address/data signal lines of the serial bus.

3. The apparatus of claim 1, further comprising:
a module that includes the service processor, the communication bridge device, the serial bus, and the first and second sideband signal lines, wherein the bus interface circuit is configured to communicate parity error information in response to detecting a parity error condition for data transmitted by the service processor over the serial bus to the communication bridge device.

4. The apparatus of claim 1, wherein the bus interface circuit is further configured to drive parity information on the second sideband signal line for information transmitted over the serial bus.

5. The apparatus of claim 1, wherein the bus interface circuit is further configured, to drive an error indication on the first sideband signal line in response to detecting the error condition, and wherein the bus interface circuit is further configured to drive an error type value on the second sideband signal line to indicate a type of the detected error condition.

6. The apparatus of claim 5, wherein the bus interface circuit is configured to drive a first error type value on the second sideband signal line that indicates that the error condition corresponds to a parity error.

7. The apparatus of claim 5, wherein the bus interface circuit is configured to drive a second error type value on the second sideband signal line to indicate a transaction fault not related to a parity error.

8. The apparatus of claim 2, further comprising:
a module that includes the service processor, the communication bridge device, the serial bus, and the first and second sideband signal lines, and wherein the service processor is configured to transmit parity information on the set of address/data signal lines of the serial bus during the bus transaction from the service processor to the communication bridge device, wherein the bus transaction is a read transaction that uses a read address.

9. The apparatus of claim 8, wherein the bus transaction is a read transaction, and wherein the service processor is configured to perform the read transaction using a read address with unused address bits.

10. The apparatus of claim 5, further comprising:
a module that includes the service processor, the communication bridge device, the serial bus, and the first and second sideband signal lines; and
wherein the bus interface circuit is further configured, in response to detecting no error condition in a read request by the service processor, to drive parity information on the second sideband signal line, wherein the parity information corresponds to data transmitted over the serial bus by the communication bridge device in response to the read request.

11. A method, comprising:
a service processor transmitting a read request over an ISA-compatible low pin count bus to a communication bridge device, wherein the transmitting includes the service processor transmitting information to the communication bridge device during an addressing portion of the read request, wherein the information includes an address for the read request and parity information for the read request, wherein the parity information is transmitted, via at least one of a first sideband signal line and a second sideband signal line, during a part of the addressing portion of the read request corresponding to available address bits that are unused by the address indicated by the read request; and
the service processor receiving, over the low pin count bus, data from the communication bridge device that is responsive to the read request.

12. The method of claim 11, further comprising:
the service processor receiving, over at least one of the first sideband signal line and the second sideband signal line to the low pin count bus, parity information for the data that is responsive to the read request.

13. The method of claim 11, further comprising:
the service processor receiving, over the first sideband signal line to the low pin count bus, an error indication from the communication bridge device, wherein the error indication corresponds to the read request.

14. The method of claim 13, further comprising:
the service processor receiving, over the second sideband signal line to the low pin count bus, an error type value indicating a type of error indicated by the error indication over the first sideband signal line.

15. The method of claim 14, further comprising:
the service processor transmitting a different read request over the low pin count bus to the communication bridge device, wherein the different read request does not generate an error condition; and
the service processor receiving, over the second sideband signal line, parity information for data responsive to the different read request.

16. An apparatus, comprising:
a service processor;
a communication bridge device;
a low pin count bus coupling the service processor to the communication bridge device, wherein the low pin count bus has at least 5 signal lines and no more than 10 signal lines, and wherein the low pin count bus is compatible with an Industry Standard Architecture (ISA) bus; and
first and second error signal lines separate from the low pin count bus and coupling the service processor to the communication bridge device, wherein the first and second error signal lines are configured to convey information relating to errors for transactions that utilize the low pin count bus, and wherein the first and second error signal lines are sideband signal lines;
wherein the communication bridge device is configured, in response to receiving a bus transaction from the service processor that generates an error condition, to:
convey information via the first error signal line indicating the presence of an error for the bus transaction; and convey, via the second error signal line during a part of an addressing portion of a response to the bus transaction corresponding to available address bits that are unused by the response to the bus transaction, information indicating a type of the error.

17. The apparatus of claim 16, wherein the communication bridge device is configured to convey information via the second error signal line indicating that the error is a parity error.

18. The apparatus of claim 16, wherein the communication bridge device is configured to convey information via the second error signal line indicating that the error is a transaction fault not related to a parity error.

19. The method of claim 14, wherein the low pin count bus has less than 10 signal lines.

* * * * *